United States Patent [19]
Shibasaki et al.

[11] Patent Number: 5,587,010
[45] Date of Patent: Dec. 24, 1996

[54] PROCESS FOR PRODUCING FINE FLAKY ALUMINA PARTICLES AND ALUMINA-BASED PLASTIC MATERIAL

[75] Inventors: Yasuo Shibasaki, Nagoya; Kiichi Oda, Nagoya; Takeshi Fukuda, Kurobe, all of Japan

[73] Assignees: Agency Of Industrial Science And Technology, Ministry Of International Trade And Industry; YKK Corporation, both of Tokyo, Japan

[21] Appl. No.: 491,114

[22] Filed: Jun. 16, 1995

Related U.S. Application Data

[62] Division of Ser. No. 301,734, Sep. 7, 1994, which is a continuation of Ser. No. 907,933, Jul. 1, 1992, abandoned.

[30] Foreign Application Priority Data

Jul. 9, 1991 [JP] Japan ................................. 3-193668
Oct. 3, 1991 [JP] Japan ................................. 3-282015

[51] Int. Cl.$^6$ ............................................... C04B 35/10
[52] U.S. Cl. ................... 106/287.17; 106/172.1; 524/437; 501/127; 501/153
[58] Field of Search ............................ 106/197.1, 197.2, 106/287.17; 524/437; 501/127, 153

[56] References Cited

U.S. PATENT DOCUMENTS

| | | | |
|---|---|---|---|
| 4,985,380 | 1/1991 | Douden | 501/127 |
| 5,277,702 | 1/1994 | Thibault et al. | 501/153 |
| 5,306,680 | 4/1994 | Fukuda | 501/153 |
| 5,401,703 | 3/1995 | Fukuda | 501/153 |
| 5,403,795 | 4/1995 | Koyama et al. | 501/127 |

*Primary Examiner*—David Brunsman
*Attorney, Agent, or Firm*—Flynn, Thiel, Boutell & Tanis, P.C.

[57] ABSTRACT

The present invention provides a process for producing fine flaky alumina particles suitable as a raw material for ceramics, a pigment for paint and etc., wherein aluminum hydroxide or alumina hydrate having a particle size regulated to the order of submicron is subjected to a hydrothermal treatment in water or an aqueous alkali solution at a temperature of 350° C. or above under a pressure of 200 kg/cm$^2$ or below. The present invention further provides an alumina-based plastic material which is produced by kneading the aforesaid fine flaky particles with an organic water holding material and water. Methylcellulose, polyvinyl alcohol, carboxymethylcellulose, polyethylene glycol, etc. are preferably used as the organic water holding agent. The alumina-based plastic material has a high plasticity, so that there is no need of using a large amount of a binder. Thus a dense molded article having stable properties can be prepared.

4 Claims, 3 Drawing Sheets

PROCESS FOR PRODUCING FINE FLAKY ALUMINA PARTICLES AND ALUMINA-BASED PLASTIC MATERIAL

This is a division of Ser. No. 08/301,734, filed Sep. 7, 1994, which is a continuation of Ser. No. 07/907,933, filed Jul. 1, 1992 now abandoned.

BACKGROUND OF THE INVENTION

1. Field of the Invention

The present invention relates to a process for efficiently producing fine flaky alumina particles suitable as a raw material for ceramics, a pigment for paint, etc., through a hydrothermal treatment.

Furthermore, the present invention relates to an alumina-based plastic material using an alumina powder consisting of the fine flaky alumina particles obtained by the above-mentioned process in which the alumina powder develops plasticity when kneaded with water.

2. Description of the Related Art

An alumina powder which is a representative raw material for fine ceramics has been widely used as a material having excellent heat resistance, electrical insulating properties, mechanical strengths and other properties in the field of structural components, electronic components, etc. In the molding of the alumina powder, however, no clay-like plasticity is developed through mere kneading of the alumina powder with water when the molding is conducted through the utilization of the plasticity. For this reason, in order to obtain the plasticity necessary for the molding, the plastic molding has been conducted after the incorporation of various molding assistants, for example, plastic clay and a large amount of an organic binder in the alumina powder. When these molding assistants are used in large amounts, there occur such problems that degreasing becomes necessary in the subsequent step, the molding density lowers and further the sinter becomes heterogeneous.

On the other hand, kaolinite clay, which has been used as the raw material for ordinary potteries, has itself a large plasticity. Motoki, Okuda, et al. (Yogyo Genryo, the fourth series, 99–106 (1952); Nendo Kagaku, 8, 14–23 (1968)) describe that factors for developing the plasticity are that (a) particles are fine and in a near colloidal region, (b) the form of the particle is flat, and (c) a water film formed with water (by a hydrogen bond) on the surface of the particle is thick. They, however, point out also that there remain many problems open on the development of the plasticity.

Various processes for producing fine alumina particles used in the above-mentioned fine ceramics are known in the art. In general, fine alumina particles of the order of submicron (i.e., 1.0 µm or less) have been produced by pulverization through the use of mechanical means such as a ball mill. In this case, although fine particles can be obtained, no fine particles in the flaky form can be produced. Bayer's process, which is known as a process for producing alumina particles on a commercial scale, has a problem that not only alumina particles having a high purity are difficult to produce by this process but also the particles produced thereby are liable to become spherical.

Known processes for producing flaky alumina particles include a process disclosed in Japanese Patent Publication No. 35-6977, which comprises adding a mineralizer such as aluminum fluoride in the calcination step. Also known is a process described in Japanese Patent Publication Nos. 37-7750 and 39-13465, which comprises conducting hydrothermal synthesis to produce alumina particles.

Among the above-described processes for producing flaky alumina particles, the process wherein a mineralizer is added has problems on the preparation of fine particles and the service life of the apparatus. Also the hydrothermal synthesis process has a problem on the preparation of fine particles because, as is apparent from the description of the above-described publications, the particle size is of the order of from several microns to several hundred microns.

SUMMARY OF THE INVENTION

In view of the above-described conventional techniques, an object of the present invention is to provide a process for producing fine flaky alumina particles, preferably fine flaky alumina particles of the order of submicron suitable as a raw material for fine ceramics, at a high efficiency.

A further object of the present invention is to impart a large plasticity comparable to that of kaolinite clay to alumina particles used in the production of fine ceramics, thereby attaining excellent moldability and, at the same time, improving the molding density.

The present invention relates to a process for producing fine flaky alumina particles, the process comprising subjecting aluminum hydroxide or alumina hydrate having a particle size regulated to the order of submicron to a hydrothermal treatment in water or an aqueous alkali solution at a temperature of 350° C. or above under a pressure of 200 kg/cm$^2$ or below.

Further, the present invention relates to an alumina-based plastic material produced by kneading an alumina powder consisting of fine flaky alumina particles having a particle size of 1.0 µm or less and a thickness of 0.1 µm or less with an organic water holding material and water.

DETAILED DESCRIPTION OF THE PREFERRED EMBODIMENTS

Figure 1:
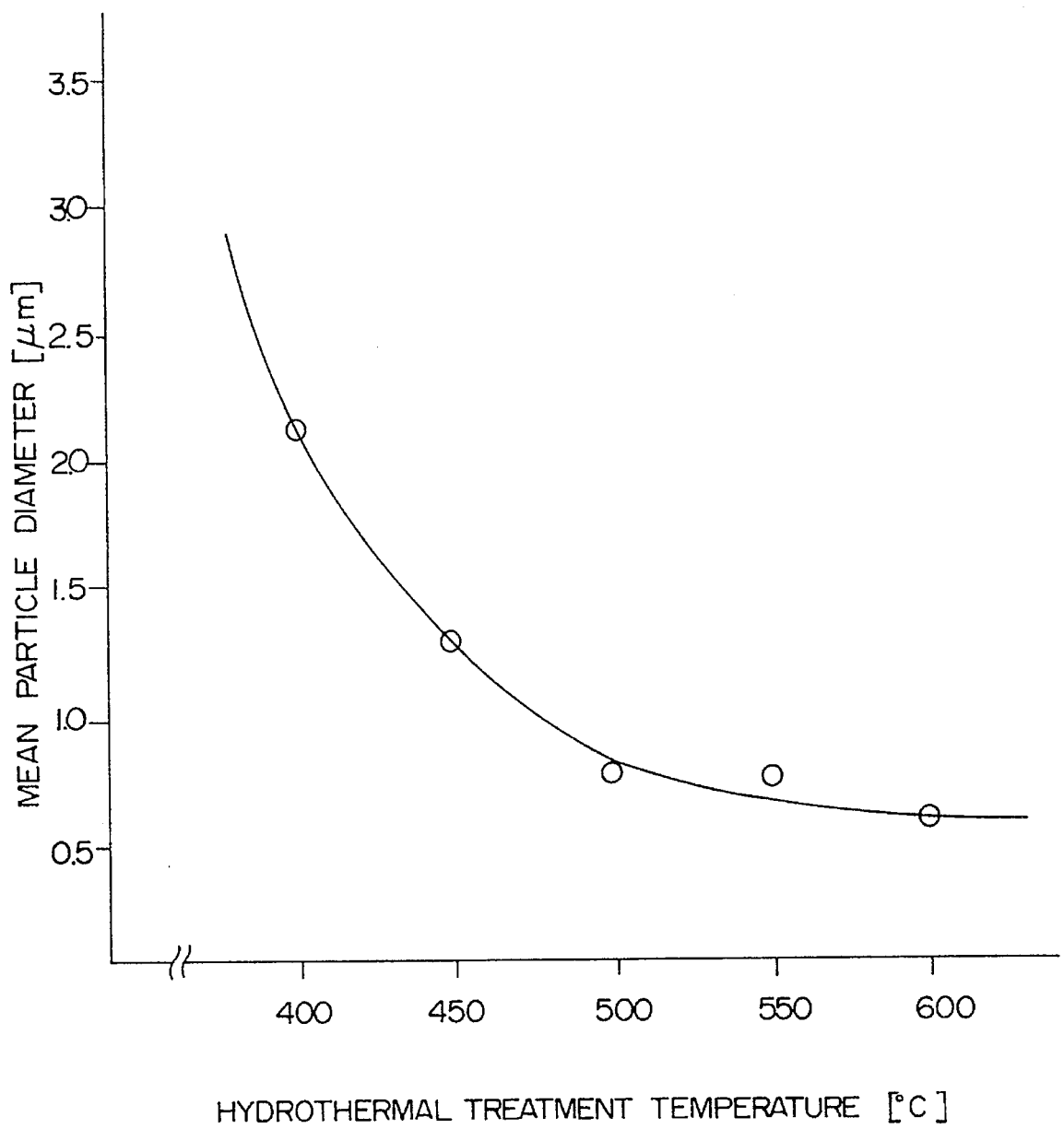
FIG. 1 is a graph showing the relationship between the hydrothermal treatment temperature and the mean particle diameter of the resultant alumina.

The starting material used for the production of the aforesaid fine flaky alumina particles of the present invention is one prepared by pulverizing an alumina hydrate, such as aluminum hydroxide or boehmite, by means of a ball mill or the like to regulate the particle size to the order of submicron of 1.0 µm or less. The starting material is filled in a hermetically sealed autoclave together with water or an aqueous solution of an alkali such as caustic soda or sodium carbonate, and the mixture is subjected to a hydrothermal treatment at a high temperature under a high pressure. The particle size regulation of the aluminum hydroxide or alumina hydrate as the starting material to the order of submicron is necessary for obtaining alumina particles having a uniform fine size, preferably of the order of submicron, as the final product. The treatment should be conducted under temperature and pressure conditions under which α-alumina is stable in the $Al_2O_3$-$H_2O$ phase diagram. The temperature is limited to 350° C. or above because no α-alumina can be obtained when the temperature is below 350° C. Although the upper limit of the temperature is not specified, it depends upon the apparatus and is preferably in a range determined by taking the cost efficiency into consideration. The higher the temperature, the higher the α-alumina formation rate and the shorter the time of formation of fine particles. The lower the temperature, the lower the α-alumina formation rate and the longer the time taken for the treatment, so that the particles become coarse. In any case, the obtained particles are flaky. The pressure is limited to 200 kg/cm$^2$ or below because when the pressure exceeds 200 kg/cm$^2$, the resultant particles become thick and coarse. The lower limit is preferably 50 kg/cm$^2$ or above because it is a matter of course that no hydrothermal system can be established in an open system.

According to the process of the present invention, it is possible to produce fine α-alumina particles wherein the crystal form is hexagonal and has a specified crystal face grown into flaky form. Further, the particles may be obtained with a diagonal length of about 1.0 μm or less and a thickness of about 0.1 μm or less. The fine flaky particles obtained by the process according to the present invention exhibit an excellent plasticity unattainable by the conventional alumina particles when they are kneaded with water. Further, when an organic water holding agent is held on their surface, it becomes possible to develop plasticity comparable to that of alumina clay. Therefore, such α-alumina particles are very useful especially as the above-mentioned alumina-based plastic material having plasticity in the field of ceramic molding, although they can be used as a pigment for paint or the like.

In the alumina-based plastic material of the present invention, it is essential that the form of alumina particles constituting alumina powder is flaky, and the particles should be fine, that is, have a size of 1.0 μm or less and a thickness of 0.1 μm or less. The plasticity lowers when the form is not flaky or the particles have larger size and thickness. A hexagonal flaky form is particularly preferred from the viewpoint of the closest packing of particles.

The organic water holding agent is not particularly limited as far as it can impart a water holding property and a fluidity to the kneading material. For example, there are a wide variety of the organic water holding agents ranging from naturally occurring substances, such as tragacanth gum, to synthetic polymers. The organic water holding agent is mainly at least one member selected among polyvinyl alcohol, polyvinyl butyrate, polyethylene glycol, methylcellulose, carboxymethylcellulose, ethylenecellulose and hydroxypropylcellulose. Among them, methylcellulose, polyvinyl alcohol, carboxymethylcellulose and polyethylene glycol are particularly preferred from the viewpoint of the water holding property and fluidity.

When these organic water holding agents are contained in a small amount, it becomes possible for the alumina particle having the above-described form to be plastically molded like clay in the presence of water.

The present invention will now be described in more detail with reference to the following Examples.

EXAMPLE 1

10 g of aluminum hydroxide produced by Bayer's process and regulated in the particle size to have a center diameter of 0.7 μm was formed into a slurry with a specified amount of pure water, and the resultant slurry was filled in a small autoclave to conduct a hydrothermal treatment at varied heating temperatures under a pressure of 200 kg/cm$^2$. Each of the products was washed with water, filtered and dried to give alumina powder. Each of the resultant alumina powders was used as a sample for determining the relationship between the mean particle diameter and the hydrothermal treatment temperature. The amount of pure water is specified as described above because it varies depending upon the temperature and pressure conditions.

The mean particle diameter was measured by the determination of a particle size distribution and the observation of the particle under a scanning electron microscope. The results of measurement are shown in FIG. 1.

It is apparent from FIG. 1 that the mean particle diameter of α-$Al_2O_3$ particles produced by the hydrothermal treatment (hydrothermal synthesis process) tends to decrease on the higher temperature side and increase on the lower temperature side. This is true of the thickness of the particle.

EXAMPLE 2

10 g of aluminum hydroxide produced by Bayer's process and regulated in the particle size to have a center diameter of 0.7 μm was formed into a slurry with a specified amount of pure water, and the resultant slurry was filled in a small autoclave to conduct a hydrothermal treatment at a heating temperature of 500° C. with the pressure within the autoclave being varied from the atmospheric pressure to about 600 kg/cm$^2$. Each of the products was washed with water, filtered and dried to give alumina powder. Each of the resultant alumina powders was used as a sample for determining the relationship between the mean particle diameter and the hydrothermal treatment pressure. The results are shown in FIG. 2.

Figure 2:
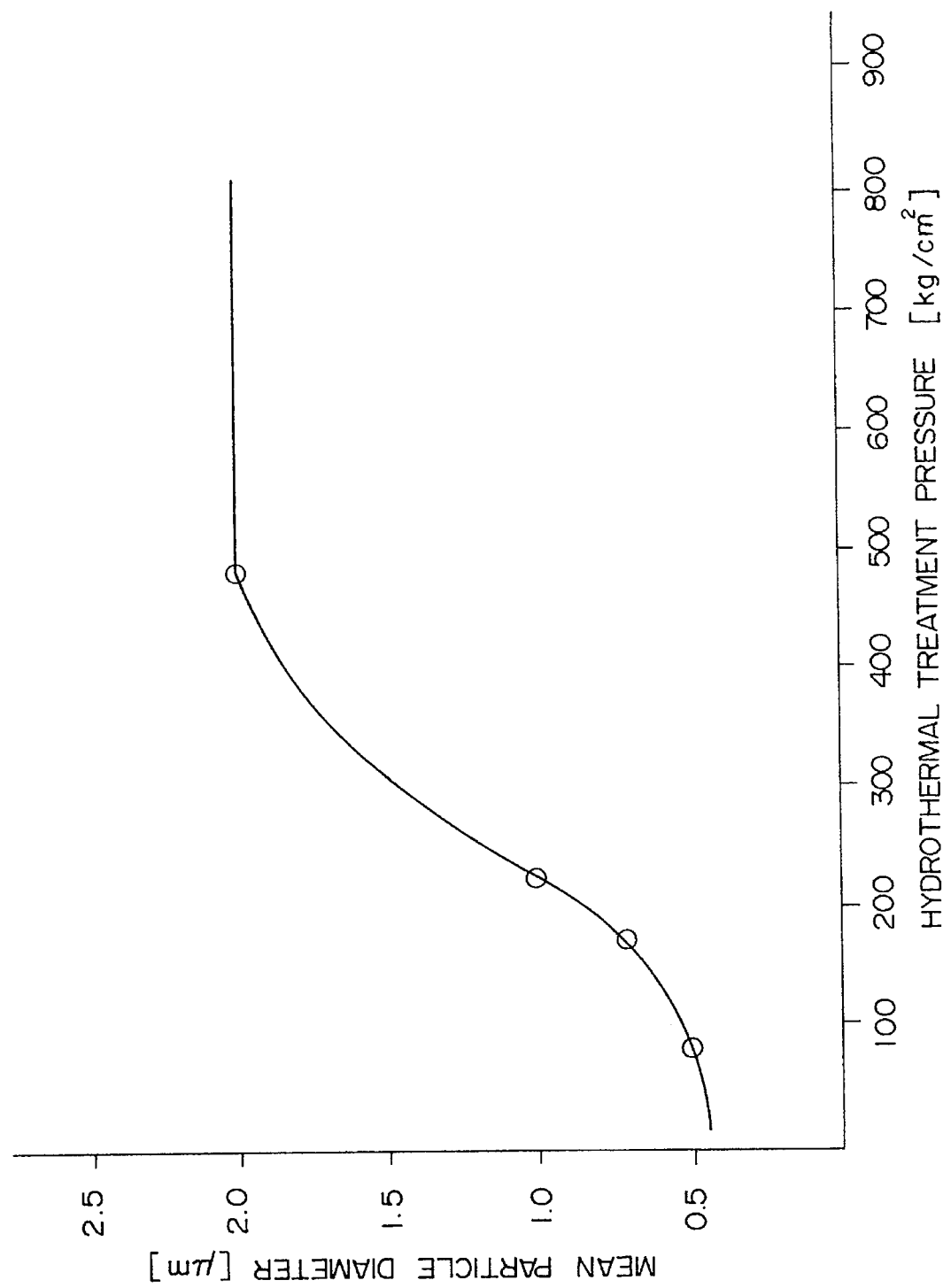
FIG. 2 is a graph showing the relationship between the hydrothermal treatment pressure and the mean particle diameter of the resultant alumina.

It is apparent from FIG. 2 that the mean particle diameter of α-$Al_2O_3$ particles produced by the hydrothermal treatment (hydrothermal synthesis process) tends to decrease on the lower pressure side and increase on the higher pressure side. This is true of the thickness of the particle.

As is apparent from the foregoing description, fine flaky alumina (α-$Al_2O_3$) particles can be produced by a hydrothermal treatment under the conditions of a temperature of 350° C. or above and a pressure of 200 kg/cm$^2$ or below.

EXAMPLE 3

Figure 3:
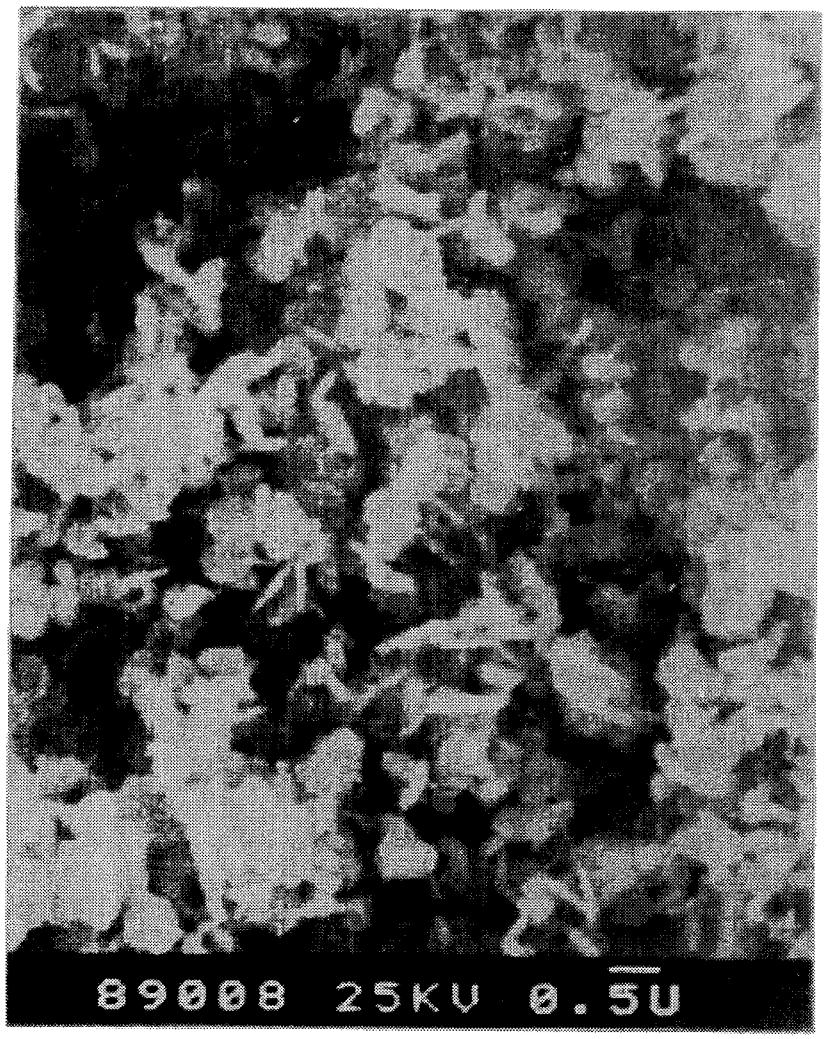
FIG. 3 is an electron photomicrograph of the structure of alumina particles produced in the Example of the present invention.

10 g of aluminum hydroxide produced by Bayer's process and regulated in the particle size to have a center diameter of 0.7 μm was formed into a slurry with a specified amount of an aqueous alkali solution, and the resultant slurry was filled in a small autoclave to conduct a hydrothermal treatment at a heating temperature of 600° C. under a pressure of 200 kg/cm$^2$ for 2 hr. The electron photomicrograph of the alumina powder is shown in FIG. 3. It is apparent from FIG. 3 that the alumina powder according to the present invention has a uniform particle diameter of a little less than about 1.0 μm and a thickness of about 0.1 μm and comprises fine flaky alumina (α-$Al_2O_3$) particles wherein the crystal is hexagonal and has a specified crystal face grown into flaky form.

EXAMPLE 4

10 g of aluminum hydroxide produced by Bayer's process and regulated in the particle size to have a center diameter of 0.7 μm was formed into a slurry with pure water, and the resultant slurry was filled in a small autoclave having a capacity of 100 cc to conduct a hydrothermal treatment at a temperature of 600° C. under a pressure of 200 kg/cm² for 2 hr. The product was washed with water, filtered and dried to prepare a sample. The resultant alumina powder was constituted of hexagonal flaky particles having a uniform particle size having a center diameter of 1.0 µm and its electron photomicrograph was almost the same as FIG. 3.

3 g of polyethylene glycol and 45 to 55 g of water were kneaded with 100 g of the alumina powder to give a plastic material of the present invention.

The plastic materials of the present invention and a commercially available kaolinite clay were evaluated for the plasticity. The plasticity was evaluated by the PfefferKorn method according to the following equation which shows the relationship between the water content and the degree of plastic deformation. In the equation, PI represents a plastic water content which is a water content of the sample having a deformation ratio of 3.3 when the sample has been dried at 100° C., WR represents a percentage water retention which is the amount of water removed during drying from 40° C. to 100° C. (a water content which is thought to correspond to bound water) and CV represents a plastic property value which is the ratio of the water retention to the plastic water content (see the Journal of the Ceramic Society of Japan, 92, 77–82 (1984)).

CV=(WR/PI)×100

The results were as follows.

|  | PI | WR | CV |
|---|---|---|---|
| commercially available kaolinite clay | 38.64 | 0.589 | 1.523 |
| plastic material of the present invention | 33.08 | 0.623 | 1.884 |

As is apparent from the above-described results of evaluation, it was confirmed that the plastic material of the present invention had plastic property values comparable to those of the commercially available kaolinite clay.

As described above, according to the present invention, it is possible to produce fine flaky alumina particles, especially fine flaky alumina particles of the order of submicron having a uniform particle diameter, and capable of finding applications as an alumina material having plasticity in the field of ceramic molding, a pigment for paint, etc., so that the present invention can exhibit an excellent effect in various industrial applications.

Particularly, when the fine flaky particles of the present invention are kneaded with an organic water holding material and water, there can be obtained an alumina-based plastic material having plasticity comparable to that of a commercially available kaolinite clay and, since a large amount of a binder (a molding assistant), as required in the conventional plastic molding, is not needed, it is possible to produce a finely densified molded article. Therefore, the alumina particles can be widely applied as a material having excellent heat resistance, electrical insulating properties, mechanical strengths and other properties in the field of structural components, electronic components, etc.

What is claimed:

1. An alumina-based plastic material produced by kneading an alumina powder consisting of fine flaky alumina particles having a particle size of 1.0 µm or less and a thickness of 0.1 µm or less with an organic water holding material and water.

2. An alumina-based plastic material according to claim 1, wherein the particles are in the form of hexagonal flaky particles.

3. As alumina-based plastic material according to claim 1, wherein the organic water holding material is at least one member selected among polyvinyl alcohol, polyvinyl butyral, polyethylene glycol, methylcellulose, carboxymethylcellulose, ethylenecellulose and hydroxypropylcellulose.

4. An alumina-based plastic material according to claim 3, wherein the organic water holding material is at least one member selected among methylcellulose, polyvinyl alcohol, carboxymethyl-cellulose and polyethylene glycol.

* * * * *